H. SCHROTTKY.
ELEVATOR ATTACHMENT FOR TRUCKS.
APPLICATION FILED APR. 20, 1918.
1,280,090.
Patented Sept. 24, 1918.
2 SHEETS—SHEET 1.
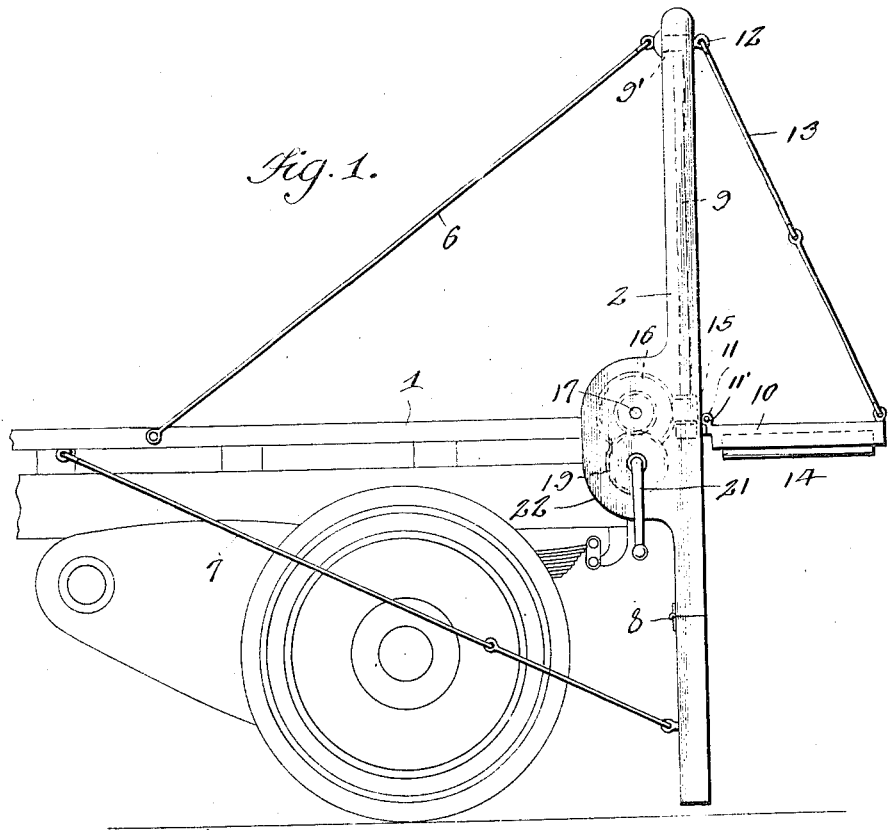
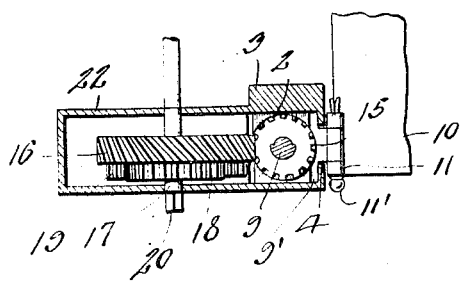
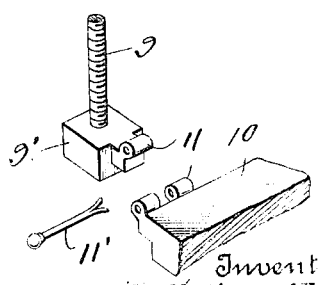
Witnesses
Inventor
H. Schrottky,
By Victor J. Evans
Attorney

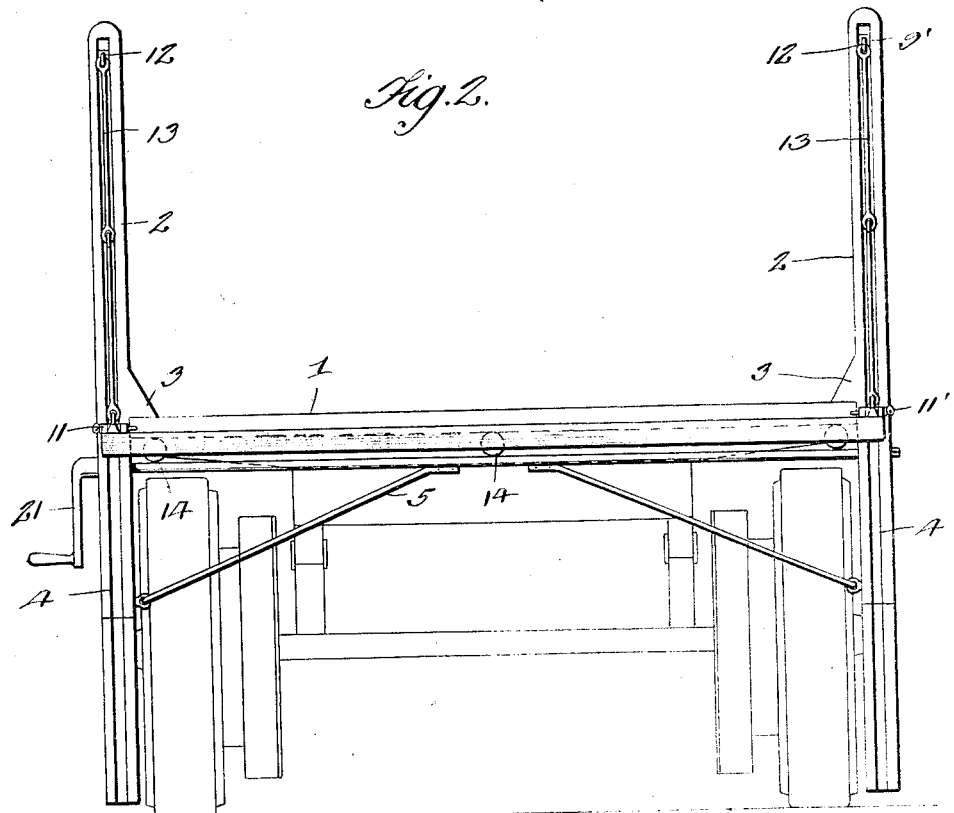
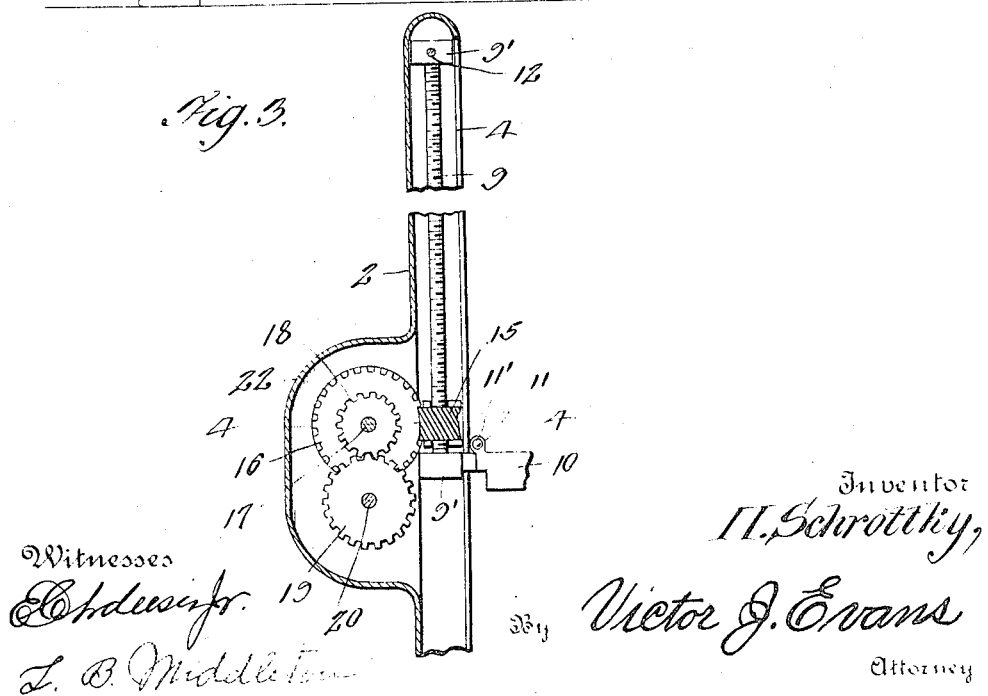

UNITED STATES PATENT OFFICE.

HENRY SCHROTTKY, OF OSHKOSH, WISCONSIN.

ELEVATOR ATTACHMENT FOR TRUCKS.

1,280,090.  Specification of Letters Patent.  Patented Sept. 24, 1918.

Application filed April 20, 1918. Serial No. 229,785.

*To all whom it may concern:*

Be it known that I, HENRY SCHROTTKY, a citizen of the United States, residing at Oshkosh, in the county of Winnebago and State of Wisconsin, have invented new and useful Improvements in Elevator Attachments for Trucks, of which the following is a specification.

This invention relates to new and useful improvements in elevator attachments for trucks and other vehicles and the principal object of the invention is to provide a hoisting device for vehicles facilitating the loading and unloading of the same.

Another object of the invention is to make the platform of the elevator detachable and provide the same with rollers whereby it may be used as a hand truck for transporting the load to and from the vehicle.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a side view showing the invention attached to a truck.

Fig. 2 is a rear view.

Fig. 3 is a longitudinal section through one of the supporting posts or guides.

Fig. 4 is a cross section on line 4—4 of Fig. 2.

Fig. 5 is a detail view of the means for connecting the platform to the lifting screw.

As shown in these drawings the rear end of the truck is indicated by the reference character 1. While the invention is more particularly adapted for use in connection with motor trucks, it will of course be understood that it may be used with vehicles of all kinds. The invention comprises a pair of supporting posts or guides 2 provided with projections 3 intermediate their ends and adapted to engage with parts of the vehicle. The guides or posts 2 are hollow and are preferably of square shape in cross section. The said guides are provided with longitudinal slots 4 on their rear faces. The said guides may be secured to the body of the vehicle in any suitable manner and they are braced by means of the lower truss rods 5 and the upper and lower longitudinally extending truss rods 6 and 7. The lower end of each guide or post is hinged to the remaining portion by means of the hinge 8 so that this lower portion may be swung up when the vehicle is to be moved. The truss rod 7 is jointed to permit this movement of the lower portion of the guides. 9 is a pair of worm shafts located in the guides and provided with square ends 9' to engage with the square sides of the guides to prevent rotation of the shafts. 10 indicates the platform of the elevator which is connected with the lower ends of the shafts by means of the hinges 11, said hinges being provided with the removable pins 11' so that the platform may be detached from said shafts. An eye bolt 12 is carried by the upper end of each of the shafts and a jointed rod 13 connects each eye bolt with the outer edge of the platform. If desired a chain may replace said rod. The platform 10 is provided with rollers 14 journaled in its under side so that said platform may be used as a hand truck when detached from the screw shafts. The shafts are given vertical movement in the guides by means of internally threaded nuts 15 engaging the threads of the shafts and having teeth on the outer circumference engaging with the gears 16 located on a shaft 17 and this shaft is provided with small gears 18 which mesh with gears on a shaft 20 which may be driven by a crank 21 or if desired from the motor of the vehicle. The shafts 17 and 20 are carried by plates 22 connected with the posts or guides 2.

It will thus be seen that the platform 10 may be lowered to the level of the street, the freight to be transported by the truck loaded thereon, then said platform can be raised to the level of the truck floor so that the load carried by said platform may be easily shifted to the truck. When desired the platform 10 may be detached from the screw threads and used as a hand-truck. When in raised position said platform may be used as a tail gate and in this position may support part of the load.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

An elevator attachment for vehicles comprising a pair of guides secured to the vehicle, said guides having their lower portions hinged to the remaining portion, vertically movable members in said guides, means for moving said members, and a platform connected with said members.

In testimony whereof I affix my signature.

HENRY SCHROTTKY.